No. 670,241. Patented Mar. 19, 1901.
R. McCORD.
NON-REFILLABLE BOTTLE.
(Application filed July 12, 1900.)
(No Model.) 2 Sheets—Sheet 1.
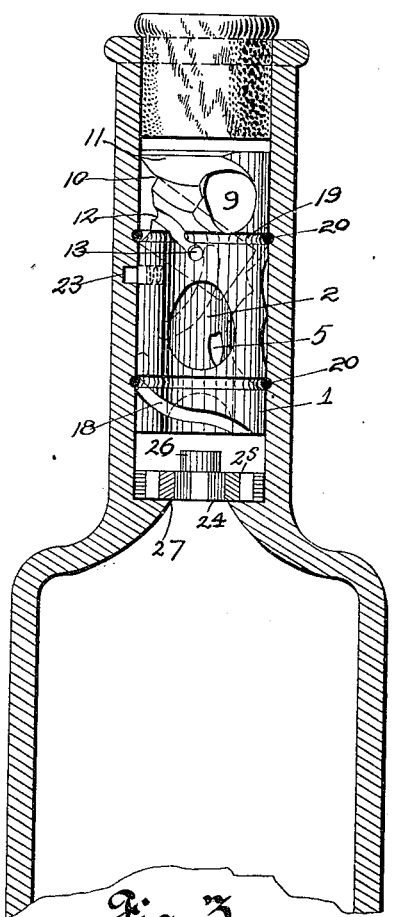
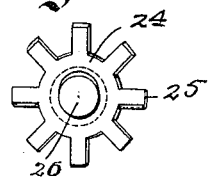
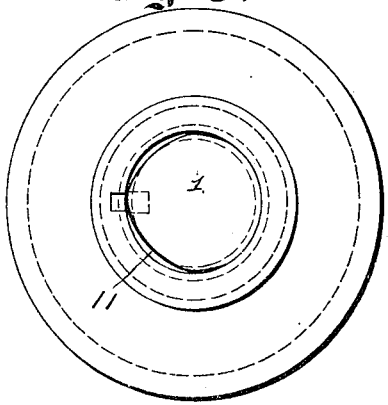
Witnesses:
Fred W. Duenckel.
J. D. Rippey.
Inventor:
Ralph McCord.
By Higdon & Longan Attys.
THE NORRIS PETERS CO., PHOTO-LITHO., WASHINGTON, D. C.

No. 670,241. Patented Mar. 19, 1901.
R. McCORD.
NON-REFILLABLE BOTTLE.
(Application filed July 12, 1900.)
(No Model.) 2 Sheets—Sheet 2.
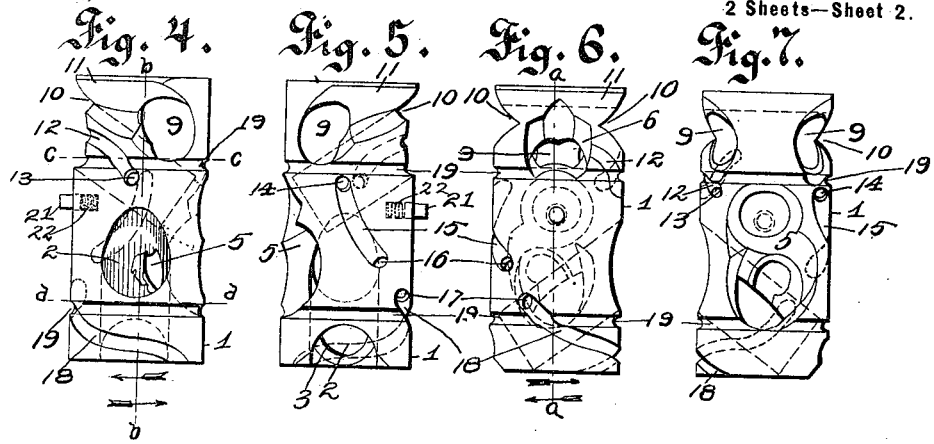
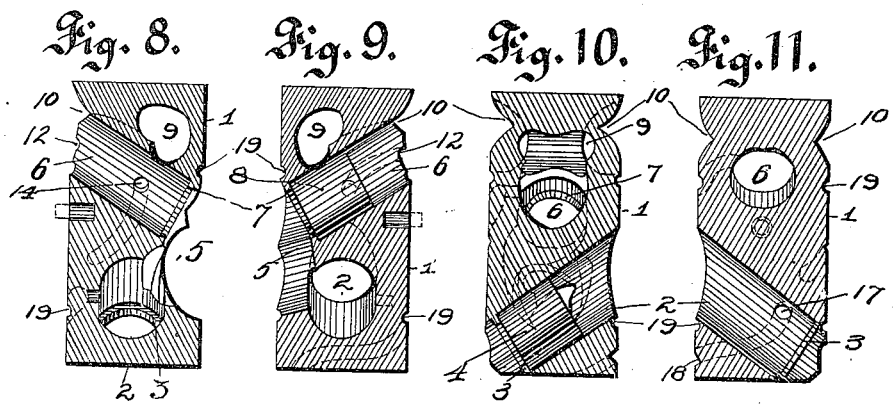
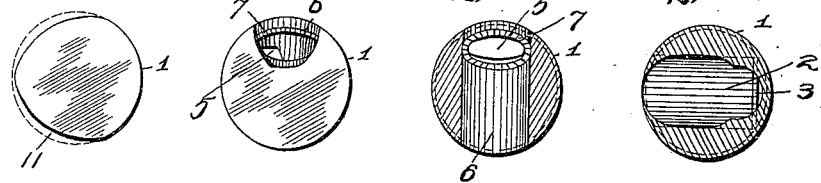
Witnesses:
Fred. W. Dueuckel.
John D. Rippey
Inventor:
Ralph McCord.
By Higdon Longan attys.

UNITED STATES PATENT OFFICE.

RALPH McCORD, OF ST. LOUIS, MISSOURI, ASSIGNOR OF ELEVEN-TWENTIETHS TO DAVID J. KENNEDY AND CHARLES A. BUTLER, OF SAME PLACE.

NON-REFILLABLE BOTTLE.

SPECIFICATION forming part of Letters Patent No. 670,241, dated March 19, 1901.

Application filed July 12, 1900. Serial No. 23,383. (No model.)

*To all whom it may concern:*

Be it known that I, RALPH MCCORD, of the city of St. Louis, State of Missouri, have invented certain new and useful Improvements in Non-Refillable Bottles, of which the following is a full, clear, and exact description, reference being had to the accompanying drawings, forming a part hereof.

This invention relates to devices for preventing bottles and the like from being refilled; and it consists of the novel construction, combination, and arrangement of parts hereinafter shown, described, and claimed.

The object of this invention is to provide a suitable device in the nature of an automatic valve for use in bottles and the like which will allow the fluid to be removed or poured from the receptacle, but which by its peculiar construction and arrangement of parts absolutely precludes the refilling of the receptacle in combination with which it is used.

Figure 1 is a sectional view of a portion of a bottle, showing my invention applied therein. Fig. 2 is a view of a secondary valve made use of in carrying out my invention. Fig. 3 is a top view of a bottle, showing the device secured within the bottle-neck. Fig. 4 is a side elevation of my improved automatic valve detached from the bottle. Fig. 5 is a view showing the side opposite from that shown in Fig. 4. Fig. 6 is a side elevation showing the left-hand side of the device as shown in Fig. 4 turned to the front. Fig. 7 is a view showing the side opposite from that shown in Fig. 6. Fig. 8 is a vertical sectional view taken on the line *a a* of Fig. 6 and looking to the left, as indicated by the arrow. Fig. 9 is a view taken on the same line and looking to the right. Fig. 10 is a view taken on the line *b b* of Fig. 4 and looking to the right, as indicated by the arrow. Fig. 11 is a view taken on the same line looking in the opposite direction. Fig. 12 is a top plan view of my invention detached from the bottle. Fig. 13 is a view from below. Fig. 14 is a sectional view taken on the line *c c* of Fig. 4 and looking downwardly. Fig. 15 is a sectional view taken on the line *d d* of Fig. 4 and looking downwardly.

In carrying out this invention I provide a body 1, constructed of any suitable material, the shape of which conforms in general to the opening in which it is carried. Leading upwardly at a suitable incline from the lower corner of the body 1 is an opening 2, and integral with the body 1, near the lower portion of the opening 2, is an annular flange or valve-seat 3. A valve or plug 4 is carried within the opening 2 and normally rests upon the valve-seat 3, thereby closing the said opening and preventing any liquid which may be contained within the upper portion of the opening from passing downwardly into the receptacle. As shown, the valve or plug 4 is of such a length that it may be operated back and forth within the opening 2, and when the body 1 is inverted the said valve will slide backwardly away from the flange 3 and bear against the inner surface of the body inclosing the body 1. This will allow the liquid within the receptacle to pass upwardly into the opening 2.

Formed in one side of the body 1 is a depression 5, the lower portion of which communicates with the middle of the opening 2, thereby forming a continuous opening or passage comprising the opening 2, through which the fluid passes when the body 1 is inverted, and the depression 5, into which the fluid may pass from the opening 2. Formed in the body 1, above the opening 2 and at right angles thereto, is a similar opening 6, which is also arranged on an incline and the lower end of which communicates with the upper portion of the depression 5, and formed within the said opening and integral with the body 1 is an annular flange or valve-seat 7, similar in all respects to the valve-seat 3. A valve or plug 8, similar to the valve 4, operates within the opening 6 and normally rests upon the valve-seat 7, and whenever the body 1 is inverted it operates upwardly away from the valve-seat 7 and bears against the inner surface of the receptacle within which the body 1 is contained. After the liquid has been allowed to enter the depression 5 in the manner described, the receptacle being still inverted, it passes into the opening 6, from which it passes into the horizontal opening 9, communicating with the lower portion of the opening 6.

As shown in Fig. 9, the valve 8 when in its normal position and bearing upon the valve-seat 7 closes the communication between the openings 9 and 6, thereby preventing any liquid which may be contained within the opening 9 from entering the opening 6 or passing into the depression 5. Leading around from the ends of the opening 9 are suitable V-shaped grooves 10, the ends of which communicate with each other and with the upper end of the opening 6. By this means a continuous passage is formed from the interior of the receptacle, the fluid first entering the opening 2, whence it passes into the depression 5, from which it enters the opening 6, and passing from there enters the opening 9 and then passes into the V-shaped grooves 10, from which it is allowed to pass into any suitable receptacle along the cut-away portions 11 at the upper extremity of the body 1. The liquid will continue to flow through the continuous passage so formed until the valves 4 and 8 assume their normal position upon the valve-seats 3 and 7, which they will only do whenever the body 1 is turned into its normal upright position; but after the body 1 is turned into its normal position the passage formed by the series of openings is closed, as described, the valves 4 and 8 sliding back again upon the valve-seats 3 and 7, thereby absolutely preventing any liquid from being poured into the receptacle in whatever position the receptacle may be placed, since in whatever position it is placed one of the valves will necessarily be in a closed position.

I have shown and described a body containing two openings having valves operating therein; but the same principle would apply to a greater or less number, and I do not desire to limit myself to any specific number.

I provide an air-vent by means of which the air is admitted to the interior of the receptacle when the device is in use, as will now be described.

Leading around the outer surface of the body 1 from the upper end of the opening 6 is a depression 12, which extends downwardly a suitable distance and opens into the opening 6, as indicated by 13. This opening 13 is closed by the valve 8 when the said valve is in its normal position; but the said valve is removed therefrom whenever the body 1 is inverted, thereby allowing the air which enters the depression 12 to pass therethrough into the lower portion of the opening 6. Leading from the opening 6 opposite from the opening 13 is a similar opening 14, which is normally closed by the valve 8, but is opened whenever the body 1 is inverted, thereby allowing the air which has passed into the opening 6 to pass through the opening 14 into the depression 15, formed in the surface of the body 1. From the depression 15 the air passes through the opening 16 into the lower portion of the opening 2, which opening 16 is normally closed by the valve 4. An opening 17 leads from the lower portion of the opening 2 and communicates with the depression 18, formed in the surface of the body 1, the said depression 18 being formed at a suitable incline and being extended downwardly to the lower extremity of the body 1. By means of the different openings and depressions described a continuous passage for air is formed from the upper portion of the body 1 to the interior of the receptacle, thereby allowing the air to pass within the receptacle as the fluid passes out.

Formed around the body 1 are grooves 19, within which pieces of packing 20 are placed when the body is inserted for use, the said packing preventing the liquid from passing down the sides of the body 1.

Carried by one side of the body 1 is a spring-actuated lock 21, which is normally forced outwardly by means of a suitable coil-spring 22, carried within a depression in the side of the body 1, the said lock 21 engaging within a notch 23, formed on the inside of the receptacle within which the body 1 is contained. By this means the body is locked in position therein and it is impossible to remove it therefrom.

In combination with the device above described I make use of a secondary valve, a form of which is shown in Fig. 2. This valve comprises an annular body portion 24, projecting radially from which is a series of arms 25, and integral with the upper side of the body portion 24 is a lug 26. The diameter of the secondary valve, including the projections 25, is equal to the diameter of the opening within which the valve is contained. The said valve when in use rests upon a suitable valve-seat 27, and the opening leading through the said valve-seat is smaller than the diameter of the body portion 24 of the valve. By this means the opening is closed whenever the valve rests in its normal position and is only opened whenever the receptacle is inverted. However, whenever the said receptacle is inverted the liquid passes through the opening through the valve-seat 27, between the arms 25 and is thereby allowed to enter the opening 2 within the body 1, the said valve being carried, as shown, below the body 1 when in use.

A device constructed as described may be used in combination with bottles and the like and, as described, will allow the liquid from within the bottle to be poured therefrom, but will operate automatically to prevent any liquid whatsoever from being passed into the bottle or other receptacle in combination with which the device may be used. No access can be had to the valves 4 and 8 to hold them out of their normal position, and thereby allow the liquid to pass into the bottle, and even though the said valves should be removed from their normal position the auxiliary valve will prevent the liquid from passing into the body of the bottle, the said valve resting upon its valve-seat so long as the receptacle is in its normal position, and if the receptacle be inverted the liquid will again flow out through the passage comprising the several openings described.

I claim—

1. In combination with a suitable receptacle, an automatic valve consisting of a single body having a series of openings therethrough, to pass the liquid, air-vents around the body and leading into the openings, and valves carried within said openings and adapted to close both the liquid-openings and the air-vents, substantially as specified.

2. In combination with a receptacle, an automatic valve consisting of a body having liquid-passages leading therethrough, and air-vents around the body, plugs carried within the liquid-passages, and means whereby the plugs within the liquid-passages will normally close the air-vents, substantially as specified.

3. In combination with a receptacle, a device to prevent refilling comprising a body having liquid-passages leading therethrough, an air-vent leading into the liquid-passages, and valves carried within the liquid-passages and adapted to close both the liquid-passages and the air-vent, substantially as specified.

In testimony whereof I affix my signature in presence of two witnesses.

RALPH McCORD.

Witnesses:
EDWARD E. LONGAN,
JOHN D. RIPPEY.